Nov. 4, 1924.  
F. KAISER  
1,514,052  
PIPE COUPLING OR JOINT  
Filed Aug. 1, 1922　　2 Sheets-Sheet 1

WITNESSES:

INVENTOR  
Frederick Kaiser  
BY Joshua R. H. Potts,  
HIS ATTORNEY

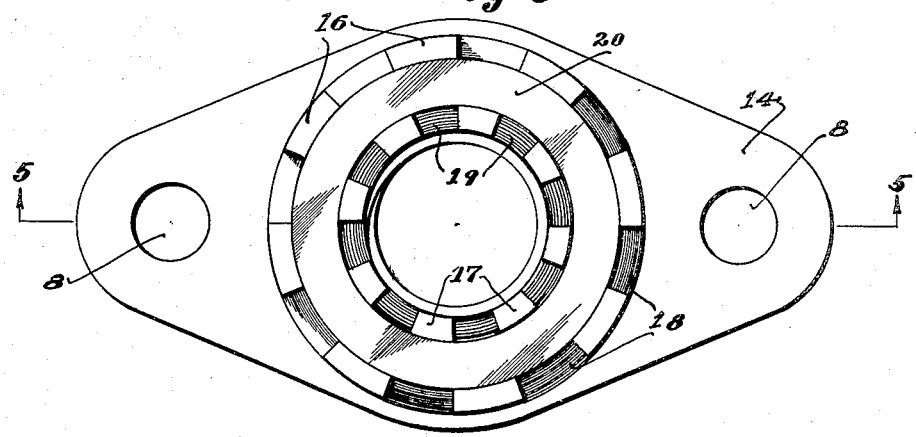
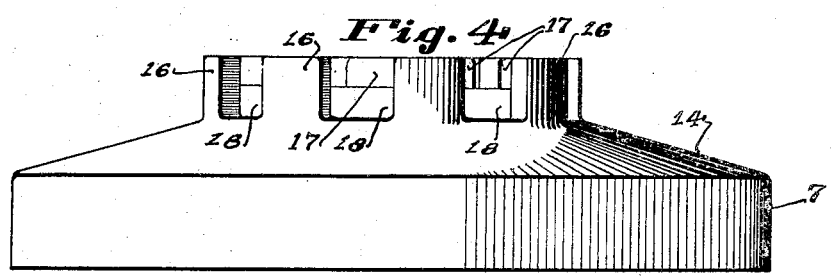
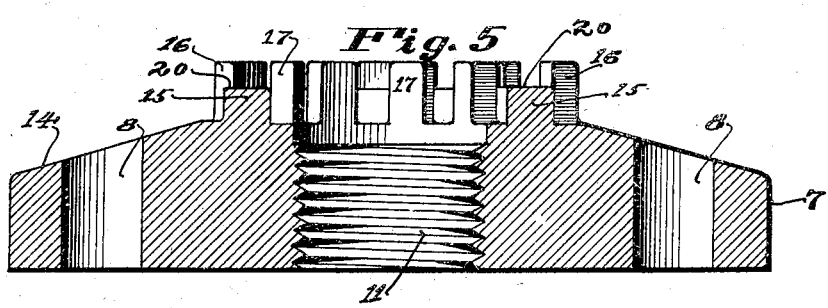

Patented Nov. 4, 1924.

1,514,052

UNITED STATES PATENT OFFICE.

FREDRICK KAISER, OF AUDUBON, NEW JERSEY.

PIPE COUPLING OR JOINT.

Application filed August 1, 1922. Serial No. 578,903.

*To all whom it may concern:*

Be it known that I, FREDRICK KAISER, a citizen of the United States, residing at Audubon, in the county of Camden and State of New Jersey, have invented certain new and useful Improvements in Pipe Couplings or Joints, of which the following is a specification.

This invention relates to pipe couplings or joints, and especially to those used in connection with ammonia valves and fittings.

It is customary in connecting pipes or tubes and fittings for conveying ammonia and other liquefiable gases and vapors of volatile liquids, to use joints or flanges having interfitting parts, one being provided with an annular projection and the other with a groove to receive the projection, in connection with an interposed gasket, but this requires two different types of fittings for each joint and the gasket is so compressed as to force it between the lateral faces of the interfitting parts with the result that the wall becomes thin and the joint leaks.

It is the object of the present invention to provide a coupling or joint and collars or flanges for use in connection therewith, so constructed that the necessity of making two sets of interfitting members is obviated, and a positive and durable fluid-tight joint produced.

These objects, and other advantageous ends which will be described hereinafter, I attain in the following manner, reference being had to the accompanying drawings in which—

Figure 1:
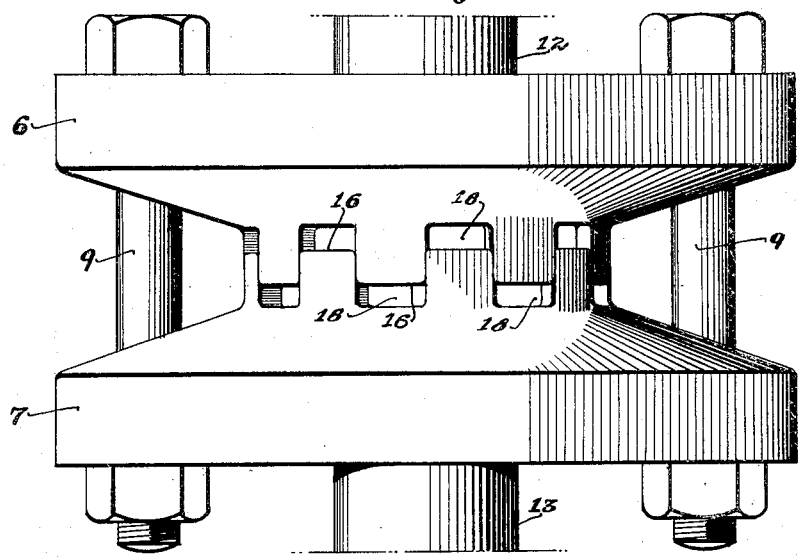
Figure 2:
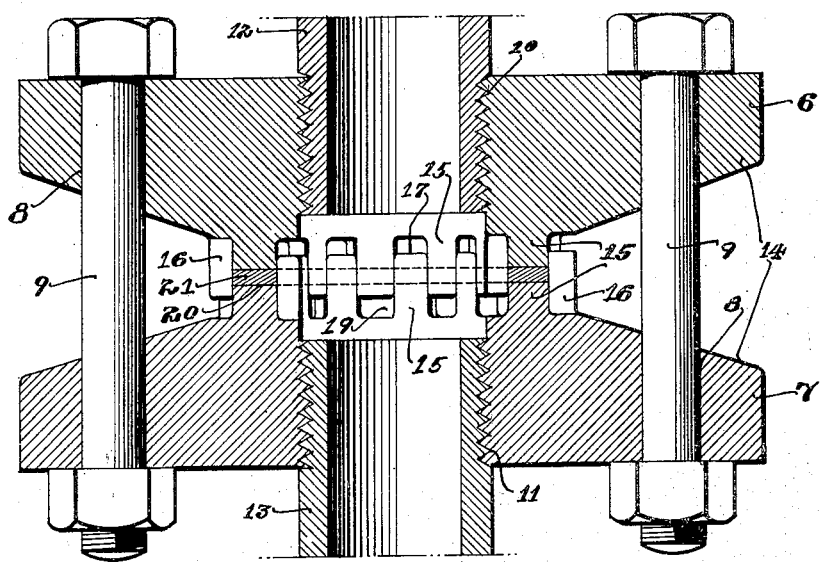

Figure 1 is a side elevation showing two pipe sections coupled in accordance with the invention, Figure 2 is a central longitudinal sectional view of the parts shown in Figure 1, Figure 3 is a face view of one of the interfitting members of a joint, Figure 4 is an edge view of the part shown in Figure 3, and Figure 5 is a sectional view taken on the line 5—5 of Figure 3.

In the drawings, the device is shown as comprising a pair of members in the form of collars or flanges 6 and 7 having any desired number of openings 8 by which they may be coupled or bolted together as indicated at 9. The flanges are provided with threaded openings or bores 10 and 11 and pipe sections 12 and 13 have threaded ends. The outer parts of the inner faces of the flanges are preferably beveled in opposite directions as indicated at 14 leaving annular projections 15 extending axially around the bores beyond the threaded parts.

The co-acting faces of the flanges are similar and a description of one will suffice. Each face is provided with an outer annular series of axially extending lugs 16 and an inner series of like lugs 17 spaced from and staggered relatively to the outer series, the lugs of each series being separated by recesses 18 and 19 of dimensions corresponding to the dimensions of the lugs. The sides of the lugs and recesses are bevelled on radial lines. The inner faces of the annular projections 15 provide annular seats 20 and, when the joint is assembled, a gasket 21 of lead composition or other suitable material is placed between the co-acting seats 20. The lugs of one flange fit in the recesses between the lugs of the other flange and overlap and contact with the lateral faces of projections 15. When the collars or flanges are forced together by the connecting means or bolts 9, the gasket is compressed between the annular seats and forced between the lugs to produce a positive and durable fluid-tight joint Owing to the snug fit of the lugs in the recesses and the corresponding widths of the seats 20, the gasket remains in a relatively thick body instead of being forced into channel shape with a thin wall and flanges, as with the joints at present in use, in which the interfitting members are relatively loose. By the construction described, it is only necessary to make fittings of one kind, each of which will co-act or interfit with the other. Since the contour of the flanges and the number of holes therein, may vary, the connecting means between the members of each joint or coupling may be placed in different relative positions so that the lugs and recesses will properly mate and interfit by turning the parts 6 and 7 relatively, as found expedient.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A pipe coupling including opposed members each having an inner and outer series of interfitting lugs, the lugs of the inner series being staggered with respect to the lugs of the outer series; and a packing disposed between said members and within said lugs.

2. A pipe coupling including opposed members each having an inner and outer annular series of interfitting lugs, the lugs in one series being staggered with respect to the lugs of the other series, all of such lugs being radially bevelled; and a packing disposed between said members and within said lugs.

3. A pipe coupling including opposed members each having integral therewith an inner and outer annular series of interfitting lugs; a raised seat for each of said members within said lugs; and a packing disposed between said members and engaging said seats.

4. A pipe coupling including opposed members each having an inner and outer annular series of interfitting lugs, the lugs in the inner series being staggered with respect to the lugs of the outer series, all of said lugs being radially bevelled; a raised seat for each of said members formed within said series of lugs; and a packing held between said members and disposed on said seats.

5. In a fitting, a pair of flanges adapted for connection of pipes; connecting means between the flanges to draw them together, each flange having an annular projection with an axially facing side and inner and outer spaced series of axially projecting lugs forming intermediate recesses of widths corresponding to the widths of the lugs, the lugs of one flange fitting the recesses of the other, and an annular packing between the seats.

In testimony whereof I have signed my name to this specification in the presence of two subscribing witnesses.

FREDRICK KAISER.

Witnesses:
FRANK S. BUTLER,
LOUISE POTTS.